US012643510B2

(12) United States Patent
Newton et al.

(10) Patent No.: US 12,643,510 B2
(45) Date of Patent: Jun. 2, 2026

(54) APPARATUS AND METHOD FOR CONTROLLING A TRAILER PARKING BRAKE INDICATOR IN A TRACTOR, AND METHOD FOR MODIFYING A TRACTOR

(71) Applicant: VOLVO TRUCK CORPORATION, Gothenburg (SE)

(72) Inventors: Robert Newton, Greensboro, NC (US); Lionel Farres, Heyrieux (FR)

(73) Assignee: Volvo Truck Corporation, Gothenburg (SE)

(*) Notice: Subject to any disclaimer, the term of this patent is extended or adjusted under 35 U.S.C. 154(b) by 146 days.

(21) Appl. No.: 18/800,077

(22) Filed: Aug. 11, 2024

(65) Prior Publication Data

US 2026/0042430 A1     Feb. 12, 2026

(51) Int. Cl.
*B60T 8/17*     (2006.01)
*B60T 7/20*     (2006.01)
*B60T 13/26*     (2006.01)
*B60T 17/22*     (2006.01)

(52) U.S. Cl.
CPC .............. *B60T 8/1708* (2013.01); *B60T 7/20* (2013.01); *B60T 13/263* (2013.01); *B60T 17/22* (2013.01)

(58) Field of Classification Search
CPC ...... B60T 8/1708; B60T 13/263; B60T 17/22; B60T 13/265; B60T 7/20
See application file for complete search history.

(56) References Cited

U.S. PATENT DOCUMENTS

| 4,586,584 | A | * | 5/1986 | Auman | B60T 13/263 |
| | | | | | 303/3 |
| 5,251,967 | A | | 10/1993 | Eberling | |
| 9,227,607 | B1 | | 1/2016 | Ripley et al. | |
| 10,363,909 | B2 | | 7/2019 | Ripley et al. | |
| 11,203,333 | B2 | | 12/2021 | Kennedy et al. | |
| 2006/0097569 | A1 | | 5/2006 | Eberling et al. | |

(Continued)

FOREIGN PATENT DOCUMENTS

WO     2020081284 A1     4/2020

OTHER PUBLICATIONS

Extended European Search Report for European Patent Application No. 25188721.2, mailed Dec. 17, 2015, 8 pages.

*Primary Examiner* — Jacob M Amick
(74) *Attorney, Agent, or Firm* — Withrow & Terranova, PLLC

(57)     ABSTRACT

An apparatus for controlling a trailer parking brake status indicator includes an arrangement for determining whether a trailer is coupled to the tractor, a control system configured to receive a signal that includes at least a determining signal from the determining arrangement that the trailer is not coupled to the tractor, the signal indicating that there is a high level of confidence that the trailer is not coupled to the tractor, and an operator controlled control, the operator controlled control being configured to provide a signal to the control system that the operator controlled control has been operated, wherein the control system is configured to turn off the trailer parking brake status indicator when the control system receives the signal that there is the high level of confidence that the trailer is not coupled to the tractor, and the operator operates the operator controlled control. Methods are also disclosed.

24 Claims, 3 Drawing Sheets

(56) References Cited

U.S. PATENT DOCUMENTS

| | | | |
|---|---|---|---|
| 2010/0085172 A1* | 4/2010 | Ancuta | .................. B60T 17/22 |
| | | | 340/431 |
| 2015/0102583 A1 | 4/2015 | Reimer | |
| 2020/0114896 A1 | 4/2020 | Kennedy et al. | |
| 2023/0024317 A1 | 1/2023 | Farres et al. | |
| 2025/0108782 A1* | 4/2025 | Lacaze | ............. B60W 40/1005 |

* cited by examiner

APPARATUS AND METHOD FOR CONTROLLING A TRAILER PARKING BRAKE INDICATOR IN A TRACTOR, AND METHOD FOR MODIFYING A TRACTOR

TECHNICAL FIELD

The disclosure relates generally to indicators. In particular aspects, the disclosure relates to trailer parking brake indicators in tractors. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Tractors of tractor/trailer combinations are often provided with trailer parking brake indicators to indicate whether the trailer parking brake is being applied, which typically involves venting a trailer air supply line between a compressor on the tractor and the trailer parking brake. The indicator is typically in the form of a light or illuminated symbol on the tractor's instrument panel. The control system of the tractor is typically configured so that, when a sensor in or near the trailer air supply line senses atmospheric or nearly atmospheric pressure in the trailer air supply line, which means that the trailer parking brake is being applied, the sensor sends a signal to the control system and the control system turns on the trailer parking brake indicator.

A problem with the existing arrangement is that, when no trailer is attached to the tractor, the free end of the trailer air supply line is exposed to the atmosphere, so the sensor in or near the trailer air supply line senses atmospheric or nearly atmospheric pressure in the trailer air supply line, which is interpreted by the control system as meaning that the trailer parking brake is being applied in an attached trailer even though, in fact, no trailer is attached to the tractor. Thus, when no trailer is attached to the tractor, the trailer parking brake indicator will always be on.

Having the trailer parking brake indicator on when no trailer is attached to the tractor can be irritating to a driver, as well as confusing to the operator.

It is desirable to provide an apparatus and method for turning off a trailer parking brake indicator when a trailer is not attached to a tractor. Additionally, it is desirable to provide a way of modifying new or existing trucks to turn off a trailer parking brake indicator when a trailer is not attached to a trailer.

SUMMARY

According to a first aspect of the disclosure, an apparatus for controlling a trailer parking brake status indicator in a tractor comprises means for determining whether a trailer is coupled to the tractor, a control system configured to receive a signal, the signal including at least a determining means signal from the determining means that the trailer is not coupled to the tractor, the signal indicating that there is a high level of confidence that the trailer is not coupled to the tractor, the trailer parking brake status indicator, the trailer parking brake status indicator turning on to provide an indication that a trailer parking brake is being applied when a pressure sensor senses a first pressure in an air supply line (a) when the air supply line is connected to the trailer parking brake of a trailer connected to the tractor and the parking brake is applied, and, alternatively, (b) when the air supply line is not connected to any trailer parking brake, and an operator controlled control, the operator controlled control being configured to provide a signal to the control system that the operator controlled control has been operated, wherein the control system is configured to turn off the trailer parking brake status indicator when (a) the control system receives the signal that there is the high level of confidence that the trailer is not coupled to the tractor, and (b) the operator operates the operator controlled control. The first aspect of the disclosure may assist in avoiding operator irritation and confusion. A technical benefit may include providing a simple, substantially cost-free means of solving a problem with trailer parking brake indicators.

Optionally in some examples, including in at least one preferred example, the operator controlled control is associated with operation of the tractor with a connected trailer. A technical benefit may include avoiding the need to add more equipment to solve a problem associated with trailer parking brake indicators.

Optionally in some examples, including in at least one preferred example, the operator controlled control is a trailer air supply lever. A technical benefit may include using existing equipment associated with operation of a tractor with a trailer to solve a problem associated with trailer parking brake indicators.

Optionally in some examples, including in at least one preferred example, the operator controlled control comprises an operator controlled service brake pedal, the service brake pedal being configured to provide a signal to the control system whether the service brake is being depressed, and an operator controlled transmission, the transmission being configured to provide a signal to the control system when the transmission has been shifted from neutral to drive. A technical benefit may include using existing equipment in a tractor to solve a problem associated with trailer parking brake indicators.

Optionally in some examples, including in at least one preferred example, the control system is configured to turn off the trailer parking brake status indicator when the operator depresses the service brake pedal and shifts the transmission from neutral to drive. A technical benefit may include using existing equipment in a tractor in a specific manner to solve a problem associated with trailer parking brake indicators.

Optionally in some examples, including in at least one preferred example, the control system is configured to turn off the trailer parking brake status indicator when, in addition to the control system receiving the signal indicating that no trailer is coupled to the tractor, and the operator operating the operator controlled control, the tractor is at standstill. A technical benefit may include providing an extra level of safety before turning off a parking brake indicator.

Optionally in some examples, including in at least one preferred example, the apparatus further comprises means for determining whether the operator has left a cab of the tractor for more than a predetermined length of time and sending a signal to the control system upon determining that the operator has left the cab of the tractor for more than the predetermined length of time, the signal indicating that there is not a high level of confidence that the trailer is not coupled to the tractor. A technical benefit may include providing an extra level of safety in the event that a parking brake indicator has already been turned off.

Optionally in some examples, including in at least one preferred example, upon turning off the trailer parking brake status indicator when the control system receives the signal that there is the high level of confidence that the trailer is not coupled to the tractor and the operator operates the operator controlled control, the control system is configured to turn on a bobtail mode indicator. A technical benefit may include providing an affirmative indicator reminding an operator that no trailer is attached to the tractor.

According to a second aspect of the disclosure, a method is provided for controlling a trailer parking brake status indicator in a tractor, comprising determining whether there is a high level of confidence that a trailer is not coupled to the tractor, sensing with a pressure sensor whether a first pressure is present in an air supply line to a trailer parking brake (a) when the air supply line is connected to the trailer parking brake of a trailer connected to the tractor and the parking brake is applied, and, alternatively, (b) when the air supply line is not connected to any trailer parking brake, turning on the trailer parking brake status indicator to provide an indication that the trailer parking brake is being applied when the pressure sensor senses the first pressure in the air supply line, operating an operator controlled control that is configured to provide a signal that the operator controlled control has been operated, turning off the trailer parking brake status indicator when (a) there is the high level of confidence that the trailer is not coupled to the tractor, and (b) the operator operates the operator controlled control. The second aspect of the disclosure may disclosure may assist in avoiding operator irritation and confusion. A technical benefit may include providing a simple, substantially cost-free means of solving a problem with trailer parking brake indicators.

Optionally in some examples, including in at least one preferred example, the operator controlled control is associated with operation of the tractor with a connected trailer. A technical benefit may include using existing equipment associated with operation of a tractor with a trailer to solve a problem associated with trailer parking brake indicators.

Optionally in some examples, including in at least one preferred example, the operator controlled control is a trailer air supply lever. A technical benefit may include avoiding the need to add more equipment to solve a problem associated with trailer parking brake indicators.

Optionally in some examples, including in at least one preferred example, the operator controlled control comprises an operator controlled service brake pedal and an operator controlled transmission. A technical benefit may include using existing equipment in a tractor to solve a problem associated with trailer parking brake indicators.

Optionally in some examples, including in at least one preferred example, the method further comprises turning off the trailer parking brake status indicator when the operator depresses the service brake pedal and shifts the transmission from neutral to drive. A technical benefit may include using existing equipment in a tractor in a specific manner to solve a problem associated with trailer parking brake indicators.

Optionally in some examples, including in at least one preferred example, the method further comprises turning off the trailer parking brake status indicator when, in addition there being a high level of confidence that no trailer is coupled to the tractor, and the operator operating the operator controlled control, the tractor is at standstill. A technical benefit may include providing an extra level of safety before turning off a parking brake indicator.

Optionally in some examples, including in at least one preferred example, the method further comprising determining whether the operator has left a cab of the tractor for more than a predetermined length of time, and upon determining that the operator has left the cab of the tractor for more than the predetermined length of time, determining that there is not the high level of confidence that the trailer is not coupled to the tractor and turning the trailer parking brake status indicator on. A technical benefit may include providing an extra level of safety in the event that a parking brake indicator has already been turned off.

Optionally in some examples, including in at least one preferred example, the method further comprises turning on a bobtail mode indicator upon turning off the trailer parking brake status indicator when there is the high level of confidence that the trailer is not coupled to the tractor and the operator operates the operator controlled control. A technical benefit may include providing an affirmative indicator reminding an operator that no trailer is attached to the tractor.

According to a third aspect of the disclosure, a method is provided for modifying a tractor comprising a trailer parking brake status indicator to control the trailer parking brake status indicator, the tractor, the trailer parking brake status indicator turning on to provide an indication that the trailer parking brake is being applied when a pressure sensor senses a first pressure in an air supply line (a) when the air supply line is connected to a trailer parking brake of a trailer connected to the tractor and the trailer parking brake is applied, and, alternatively, (b) when the air supply line is not connected to any trailer parking brake, the method comprising configuring a control system to turn off the trailer parking brake status indicator upon (a) receipt of a signal indicating that there is a high level of confidence that the trailer is not coupled to the tractor, and (b) receipt of a signal from an operator controlled control that is configured to provide a signal to the control system that the operator controlled control has been operated. The second aspect of the disclosure may disclosure may assist in avoiding operator irritation and confusion. A technical benefit may include providing a simple, substantially cost-free means of solving a problem with trailer parking brake indicators in new and in existing vehicles.

Optionally in some examples, including in at least one preferred example, the operator controlled control is associated with operation of the tractor with a connected trailer. A technical benefit may include using existing equipment associated with operation of a tractor with a trailer to solve a problem associated with trailer parking brake indicators.

Optionally in some examples, including in at least one preferred example, the operator controlled control is a trailer air supply lever. A technical benefit may include avoiding the need to add more equipment to solve a problem associated with trailer parking brake indicators.

Optionally in some examples, including in at least one preferred example, the operator controlled control comprises an operator controlled service brake pedal, the service brake pedal being configured to provide a signal to the control system when the service brake is being depressed, and an operator controlled transmission, the transmission being configured to provide a signal to the control system when the transmission has been shifted from neutral to drive. A technical benefit may include using existing equipment in a tractor to solve a problem associated with trailer parking brake indicators.

Optionally in some examples, including in at least one preferred example, the method further comprises configuring the control system to turn off the trailer parking brake status indicator when the operator depresses the service brake pedal and shifts the transmission from neutral to drive. A technical benefit may include using existing equipment in a tractor in a specific manner to solve a problem associated with trailer parking brake indicators.

Optionally in some examples, including in at least one preferred example, the method further comprises configuring the control system to turn off the trailer parking brake status indicator when, in addition to the control system receiving the signal indicating that no trailer is coupled to the tractor, and the operator operating the operator controlled control, the tractor is at standstill. A technical benefit may include providing an extra level of safety before turning off a parking brake indicator.

Optionally in some examples, including in at least one preferred example, the method further comprises configuring the control system to interpret a signal that an operator has left a cab of the tractor for more than a predetermined length of time as indicating that there is not a high level of confidence that the trailer is not coupled to the tractor. A technical benefit may include providing an extra level of safety in the event that a parking brake indicator has already been turned off.

Optionally in some examples, including in at least one preferred example, the method further comprises configuring the control system to turn on a bobtail mode indicator upon turning off the trailer parking brake status indicator when the control system receives the signal that there is the high level of confidence that the trailer is not coupled to the tractor and the operator operates the operator controlled control. A technical benefit may include providing an affirmative indicator reminding an operator that no trailer is attached to the tractor.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
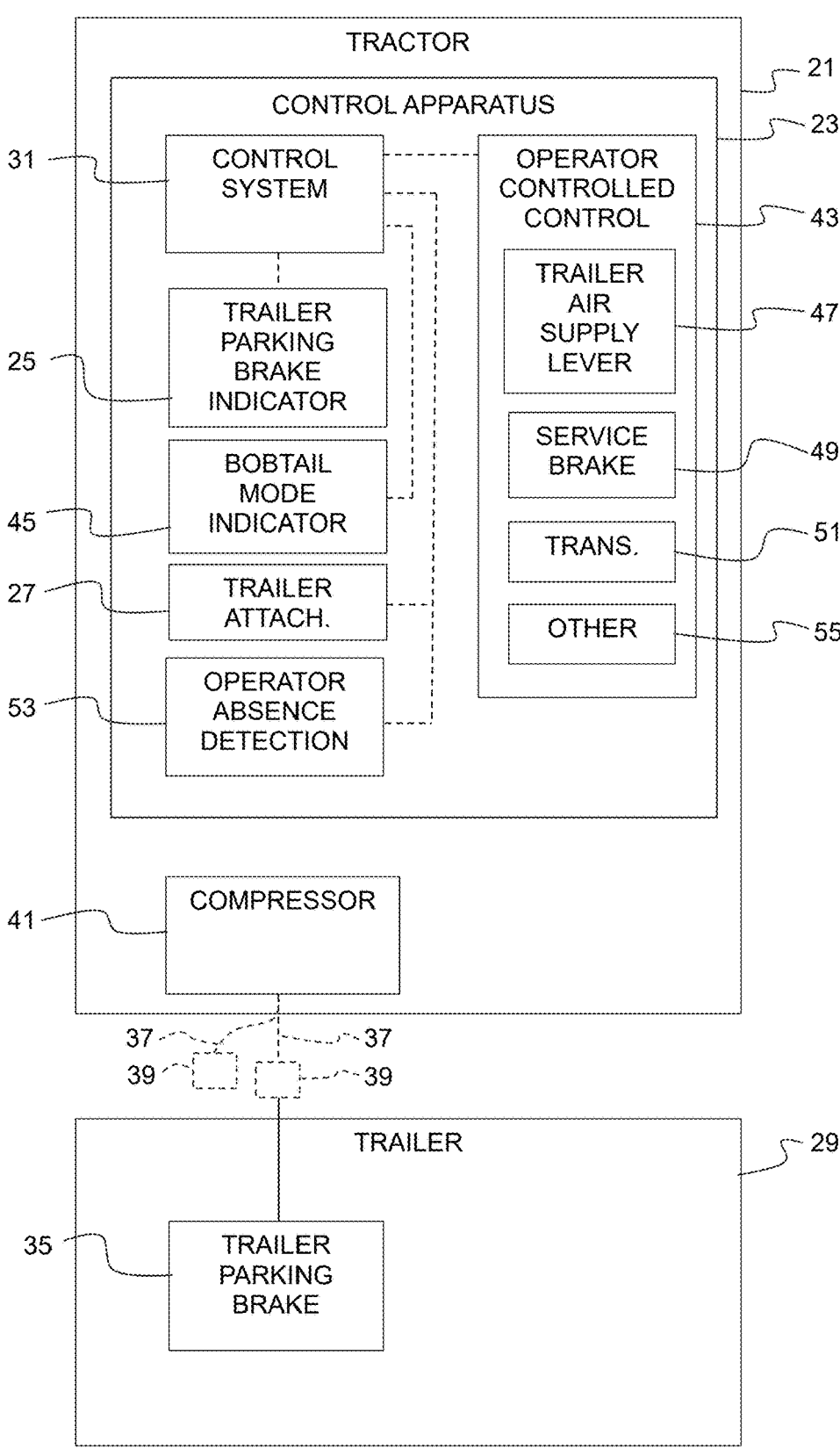
FIG. 1 is a schematic illustration of a tractor/trailer combination according to an aspect of the present invention.

A tractor 21 including an apparatus 23 for controlling a trailer parking brake status indicator (TPI) 25 in the tractor is shown schematically in FIG. 1.

The apparatus 23 includes means 27 for determining whether a trailer 29 is coupled to the tractor 21. In the trucking industry, "bobtail" usually refers to a tractor driving without a trailer attached. The determining means 27 may comprise any one or more of numerous suitable apparatus, such as those described in U.S. Pat. No. 11,203,333, which is incorporated by reference, including: a proximity sensor of the type that directs an electromagnetic or sonic wave toward where a trailer would be attached to the tractor and detects a reflection of the wave off of the trailer, if present; a fifth wheel or kingpin connection switch that closes in the presence of a trailer kingpin within the tractor's fifth wheel coupling so that a signal can be transmitted to a control system; a power management system that detects power drawn from the tractor's power source and generates a signal when power is above a level that would be expected with no trailer attached; a mass or weight estimation system that estimates the mass or weight of a vehicle for stability control and other purposes and wherein mass or weights above a predetermined level may indicate the presence of a trailer; and a communications management system for transmitting and receiving signals between the tractor and any attached trailer. U.S. Patent App. Pub. US2023/0024317A1, which is incorporated by reference, discloses yet another determining means in the form of a system that determines the presence or absence of a trailer by testing the pressure in a pneumatic line that connects the tractor to a trailer, if any.

The apparatus 23 further includes a control system 31 configured to receive a signal, the signal including at least a determining means signal from the determining means that the trailer is not coupled to the tractor, the signal indicating that there is a high level of confidence that the trailer 29 is not coupled to the tractor 21. What constitutes a "high level of confidence that no trailer is attached" can be set based on any desired criteria and may require, for example, a single determining means signal from any single suitable apparatus comprising a determining means 27, by a determining means signal reflecting the determination that no trailer is attached by more than one such suitable apparatus comprising a determining means, or by a combination of one or more determining means signals reflecting the determination that no trailer is attached by more than one such suitable apparatus comprising a determining means in combination with some action by an operator, such as the operator being in the driver's seat (and, thus, capable of visually determining that no trailer is attached) or the operator performing some specific action to signal confidence that no trailer is attached, such as manually opening or closing a switch.

The apparatus 23 also includes the TPI 25. The TPI 25 is an indicator, typically disposed in a location where it is easily visible to an operator of the tractor, such as a tractor dashboard. The TPI 25 may be any suitable form of indicator. Presently preferred indicators include indicators such as a light or symbol illuminated by a light and is controlled by the control system 31. A symbol for indicating whether a trailer 29 is attached to a tractor 21 may be in the form, for example, of a trailer with the letter "P" over it. The control system 31 is configured to turn on the TPI 25 to provide an indication that a trailer parking brake 35 is being applied when a pressure sensor 39 senses a first pressure in an air supply line 37 (shown in phantom connected and disconnected to the trailer parking brake 35). The trailer parking brake 35 will ordinarily be applied when the trailer 29 is attached to the tractor 21 and pressure in the air supply line 37 is equal to atmospheric pressure, such as by the air supply line being vented to the atmosphere, and will be released when pressure in the air supply line rises above a certain predetermined pressure as air is supplied to the air supply line by a compressor 41 in the tractor 21. Thus, ordinarily, the first pressure will be sensed by the pressure sensor 39 when the pressure senses atmospheric pressure or substantially atmospheric pressure in the air pressure supply line 37 which will be sensed (a) when the air supply line is connected to the trailer parking brake of a trailer connected to the tractor and the parking brake is applied, and, alternatively, (b) when the air supply line is not connected to any trailer parking brake, such as when the free end of the air supply line is open to the atmosphere.

The apparatus 23 also includes an operator controlled control 43. The operator controlled control 43 is configured to provide a signal to the control system 31 that the operator controlled control has been operated. The control system 31 is configured to turn off the TPI 25 when (a) the control system receives the signal that there is the high level of confidence that the trailer 29 is not coupled to the tractor 21, and (b) the operator operates the operator controlled control 43. In this way, the TPI 25 will only be turned off at the express instigation of the operator performing a specific operation (or series of operations) and when there is a high level of confidence that no trailer 29 is attached to the tractor 21.

Upon turning off the TPI 25 when the control system 31 receives the signal that there is the high level of confidence that the trailer is not coupled to the tractor and the operator operates the operator controlled control 43, the control system may be further configured to turn on a "bobtail mode" indicator 45. The bobtail mode indicator 45 may be the same indicator as the TPI 25 or a separate indicator. If the bobtail mode indicator 45 is the same indicator as the TPI 25, the bobtail mode indicator may, for example, show a symbol that the TPI uses to indicate that a trailer 29 is attached to the tractor 21 with a diagonal line through the symbol and/or with the symbol illuminated by a different color light than when a trailer is attached to indicate that no trailer is attached to the tractor.

The operator controlled control 43 may be a control associated with operation of the tractor 21 with a connected trailer 29. Use of an operator controlled control 43 associated with operation of the tractor 21 with a connected trailer 29 can be useful for turning off the TPI 25 because it indicates both confidence that no trailer is attached to the tractor and the operator's desire to turn off the TPI. A presently preferred operator controlled control 43 that is associated with operation of the tractor 21 with a connected trailer 29 is a trailer air supply lever 47 which is ordinarily a device that is operated to supply air to an attached trailer. An operator with a high level of confidence that no trailer 29 is attached to the tractor 21 would not be expected to use the trailer air supply lever 47.

The operator controlled control 43 need not be a control that is associated with operation of the tractor 21 with a connected trailer 29. For example, another embodiment of an operator controlled control 43 comprises an operator controlled service brake pedal 49 that is configured to provide a signal to the control system 31 when the service brake is being depressed, and an operator controlled transmission 51 that is configured to provide a signal to the control system when the transmission has been shifted from neutral to drive. The control system 31 can be configured to turn off the TPI 25 when the operator depresses the service brake pedal 49 and shifts the transmission 51 from neutral to drive. An operator with a high level of confidence that no trailer 29 is attached to the tractor 21 would not be expected to apply the service brake pedal 49 and shift the transmission 51 from neutral to drive.

The operator controlled control 43 need not be a control that is associated with operation of the tractor 21 with a connected trailer 29, or one that would not be expected to be performed if the operator did not have a high level of confidence that no trailer 29 is attached to the tractor 21. The control system 31 can be configured to turn off the TPI 25 when it receives the signal that there is the high level of confidence that the trailer 29 is not coupled to the tractor 21, and the operator operates substantially any action or set of actions via some other control or device 55 that can be set up to involve sending a signal to the control system that the control system is configured to interpret as being operation of the operator controlled control and reflecting the operator's desire to turn off the TPI.

The control system 31 may further be configured to turn off the TPI 25 only when, in addition to the control system receiving the signal indicating that no trailer 29 is coupled to the tractor 21, and the operator operating the operator controlled control 43, the tractor is at standstill. This additional requirement for turning off the TPI 25 can provide an additional level of safety to ensure that the TPI is not somehow inadvertently turned off when a trailer 29 is attached to the tractor 21, such as while a tractor/trailer combination is moving and the trailer parking brake 35 is applied (lowering the pressure in the air supply line to atmospheric or near atmospheric which may be incorrectly interpreted as indicating a high level of confidence that no trailer is attached) and the operator operates the operator controlled control 43.

The apparatus 23 may further comprise operator absence detecting means 53 for determining whether the operator has left a cab of the tractor 21 for more than a predetermined length of time and sending an operator absence signal to the control system 31 upon determining that the operator has left the cab of the tractor for more than the predetermined length of time. The operator absence detecting means 53 can be any suitable apparatus for detecting the presence or absence of an operator in the cab such as a driver seat occupancy sensor and/or a drowsiness surveillance camera. The control system 31 can be configured to interpret the operator absence signal as an indication that there is not a high level of confidence that the trailer 29 is not coupled to the tractor 21 or to otherwise override any other determination that there is a high level of confidence that the trailer is not connected to the trailer and turn the TPI 25 back on and turn off the bobtail mode indicator, if any.

The apparatus 23 will ordinarily be configured to periodically or continuously monitor whether all conditions necessary for turning off the TPI are being met. For example, if, after an initial determination that there is a high level of confidence that no trailer 29 is attached to the tractor 21 and, after the operator operates the operator controlled control 43, the control system 31 turns the TPI 25 off (and the bobtail mode indicator 45, if any, on), the determining means 27 cannot determine that there is a high level of confidence that no trailer is attached to the tractor, or an operator is absent from the cab for more than a predetermined length of time, the control system can be configured to turn the TPI back on (and turn any bobtail mode indicator off).

Figure 2:
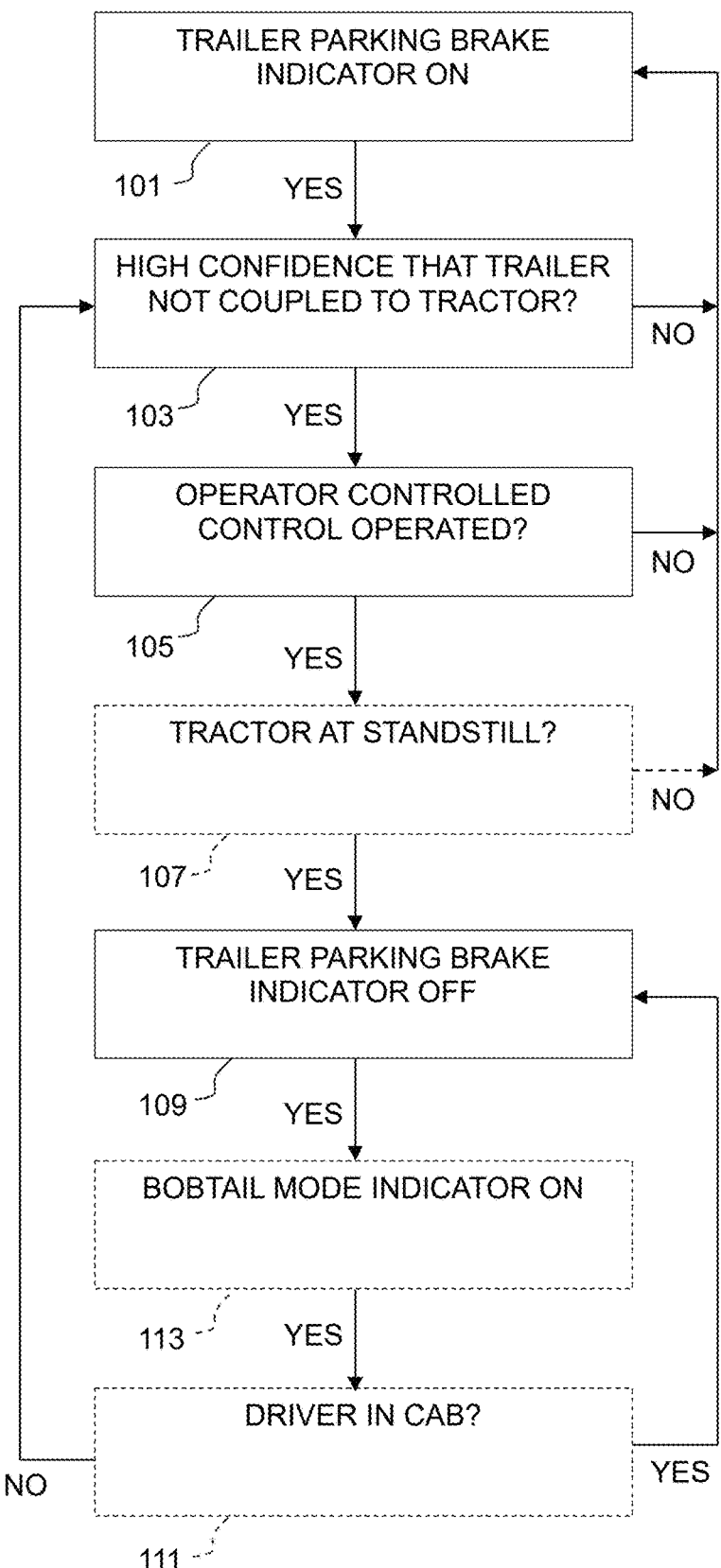
FIG. 2 is a flow chart illustrating a method for controlling a trailer parking brake indicator according to another aspect of the present invention.

Another aspect of the present invention involves a method for controlling a TPI 25 in a tractor 21 and is described in connection with the flow chart shown in FIG. 2. In step 101, the TPI 25 will be turned on, normally by the control system 31, to provide an indication that the trailer parking brake 25 is being applied when the pressure sensor 39 senses a first pressure in the air supply line 37 (and, normally, sends a signal regarding the first pressure to the control system), the first pressure (usually atmospheric or nearly atmospheric pressure) being sensed when the air supply line is connected to the trailer parking brake 35 of a trailer 29 connected to the tractor and the parking brake is applied, and, alternatively, when the air supply line is not connected to any trailer parking brake and a free end of the air supply line is open to the atmosphere. When the TPI is on in step 101, a further step 103 of determining, by any suitable technique, whether there is a high level of confidence that a trailer 29 is not coupled to the tractor 21 is performed. If it is determined that there is a high level of confidence that a trailer 29 is not coupled to the tractor 21, at step 105, an operator controlled control that is configured to provide a signal that the operator controlled control has been operated is operated. At step 109, the TPI 25 is turned off when there is the high level of confidence that the trailer 29 is not coupled to the tractor 21 at step 103, and the operator operates the operator controlled control 43 at step 105.

The operator controlled control 43 may be a control associated with operation of the tractor 21 with a connected trailer 29 such as a trailer air supply lever. Alternatively or in addition, the operator controlled control 43 may be a control not necessarily associated with operation of the tractor 21 with a connected trailer 29, but reflective of the operator's knowledge that no trailer is attached, such as an operator's operation of an operator controlled service brake pedal 49, such as where the service brake pedal being configured to provide a signal to the control system 31 when the service brake is being depressed, and an operator controlled transmission 41, such as where the transmission is configured to provide a signal to the control system when the transmission has been shifted from neutral to drive. Alternatively or in addition, the operator controlled control 43 may be a control not only not associated with operation of the tractor with a connected trailer, but also not reflective of an operator's knowledge that no trailer is attached to the tractor.

An optional step 107 (shown in phantom) prior to turning off the TPI 25, in addition to determining that there is a high level of confidence that no trailer 29 is coupled to the tractor 21, and the operator operating the operator controlled control 43, may include determining that the tractor 21 is at standstill.

The method may also include an optional step 111 (shown in phantom) of determining whether the operator has left the cab of the tractor 21 for more than a predetermined length of time and, upon determining that the operator has left the cab of the tractor for more than the predetermined length of time, turning the TPI 25 on. At the same time, the bobtail mode indicator 45, if any, can be turned off. The determination that an operator has left the cab for more than a predetermined length of time may override any determination that there is a high level of confidence that the trailer 29 is not coupled to the tractor 21.

The method may also include an optional step 113 of turning on the bobtail mode indicator 45 (if any) upon or simultaneously with turning off the TPI 25 when there is the high level of confidence that the trailer 29 is not coupled to the tractor 21 and the operator operates the operator controlled control 43.

The method can be periodically or continuously repeated after initially turning off the TPI 25 (and turning on the bobtail mode indicator 45, if any) to ensure that all conditions necessary for turning off the TPI continue to be met, such as that there continues to be a high level of confidence that no trailer is attached to the tractor and/or that an operator has not been absent from the cab for more than a predetermined period of time. In the event that one or more necessary conditions are no longer met, the TPI 25 can be turned back on (and any bobtail mode indicator 45 can be turned off).

Yet another aspect of the present invention involves a method for modifying a tractor 21 to control a TPI 25 in the tractor. The control system 31 can be configured to turn the TPI 25 to provide an indication that the trailer parking brake 35 is being applied when the pressure sensor 39 senses a first pressure (usually atmospheric or nearly atmospheric pressure) in the air supply line 37 (and, normally, sends a signal regarding the first pressure to the control system) when the air supply line is connected to the trailer parking brake 35 of a trailer 29 connected to the tractor 21 and the trailer parking brake is applied, and, alternatively, when the air supply line is not connected to any trailer parking brake and a free end of the air supply line is open to the atmosphere. This aspect of the invention facilitates adding a feature to new or existing tractors without the need for adding additional equipment but, rather, by altering how existing equipment functions. According to the method for modifying the tractor 21 to control the TPI 25 in the tractor, the control system 31 is configured to turn off the TPI upon receipt of a signal indicating that there is a high level of confidence that the trailer 29 is not coupled to the tractor, and receipt of a signal from an operator controlled control 43 that is configured to provide a signal to the control system that the operator controlled control has been operated.

The operator controlled control 43 may be a control associated with operation of the tractor 21 with a connected trailer 29 such as a trailer air supply lever. Alternatively or in addition, the operator controlled control 43 may be a control not necessarily associated with operation of the tractor 21 with a connected trailer 29, but reflective of the operator's knowledge that no trailer is attached, such as an operator's operation of an operator controlled service brake pedal 49, such as where the service brake pedal being configured to provide a signal to the control system 31 when the service brake is being depressed, and an operator controlled transmission 41, such as where the transmission is configured to provide a signal to the control system when the transmission has been shifted from neutral to drive. Alternatively or in addition, the operator controlled control 43 may be a control not only not associated with operation of the tractor with a connected trailer, but also not reflective of an operator's knowledge that no trailer is attached to the tractor.

The method may further involve configuring the control system 31 so that, prior to turning off the TPI 25, in addition to configuring the control system to turn off the TPI upon determining that there is a high level of confidence that no trailer 29 is coupled to the tractor 21, and that the operator has operated the operator controlled control 43, to also require that the tractor 21 is at standstill.

The method may also involve configuring the control system 31 so that, upon a determination that the operator has left the cab of the tractor 21 for more than a predetermined length of time, the TPI 25 is turned on. At the same time, a bobtail mode indicator 45, if any, can be turned off. The control system 31 may be configured such that determination that an operator has left the cab for more than a predetermined length of time overrides any previous determination that there is a high level of confidence that the trailer 29 is not coupled to the tractor 21.

The method may also involve configuring the control system to turn on the bobtail mode indicator 45 (if any) upon or simultaneously with turning off the TPI 25 when there is the high level of confidence that the trailer 29 is not coupled to the tractor 21 and the operator operates the operator controlled control 43.

The method may further involve configuring the control system to periodically or continuously repeat the steps involved in turning off the TPI 25 after initially turning off the TPI (and turning on the bobtail mode indicator 45, if any) to ensure that all conditions necessary for turning off the TPI continue to be met, such as that there continues to be a high level of confidence that no trailer is attached to the tractor and/or that an operator has not been absent from the cab for more than a predetermined period of time. The control system 31 may further be configured such that, in the event that one or more necessary conditions are no longer met, the TPI 25 can be turned back on (and any bobtail mode indicator 45 can be turned off).

Figure 3:
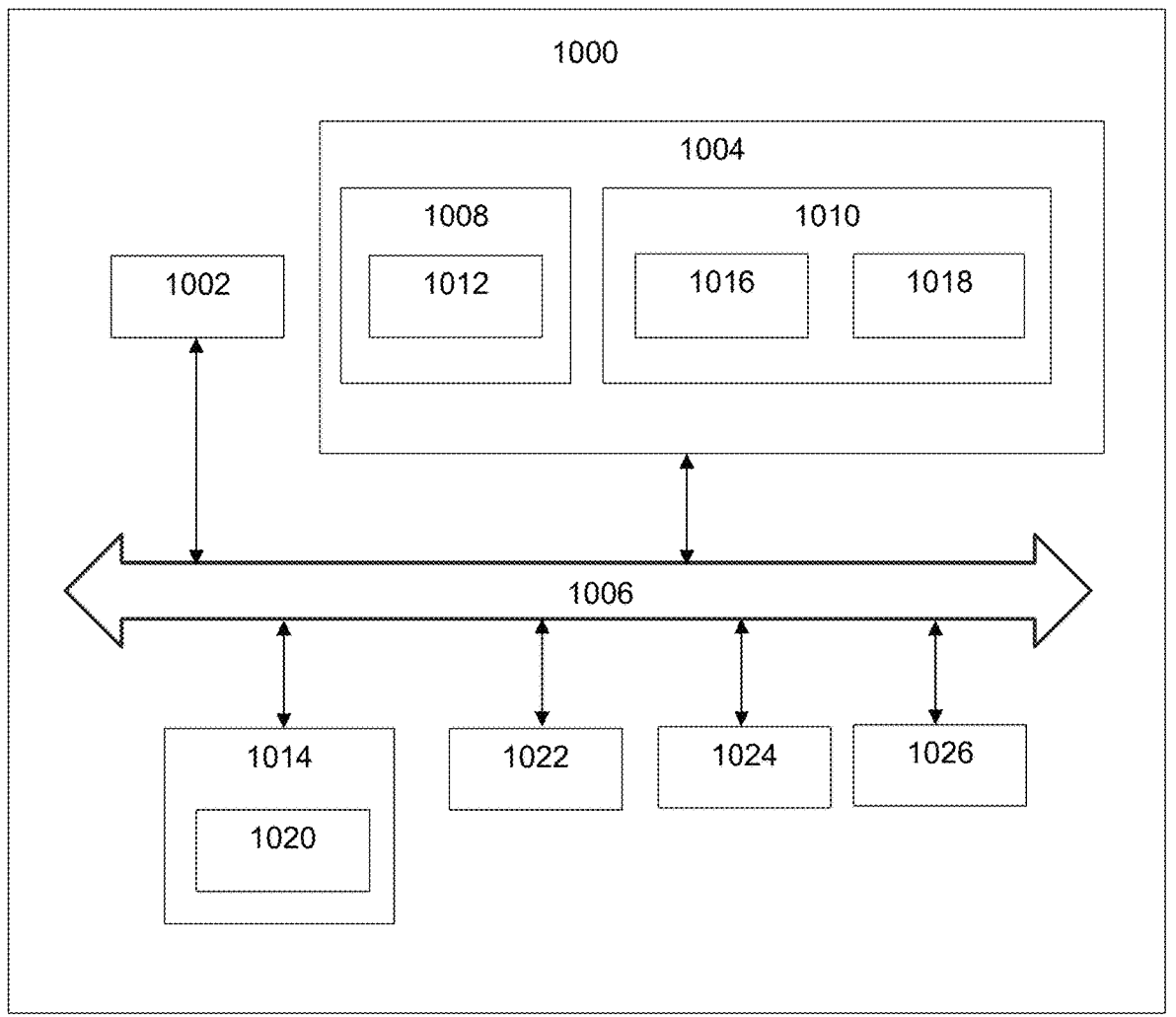
FIG. 3 is a schematic diagram of a computer system for implementing examples disclosed herein.

FIG. 3 is a schematic diagram of a computer system 1000 for implementing examples disclosed herein. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, the control system may include a single control unit or a plurality of control units connected or otherwise communicatively coupled to each other, such that any performed function may be distributed between the control units as desired. Further, such devices may communicate with each other or other devices by various system architectures, such as directly or via a Control system Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory control system), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a control system or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1. An apparatus for controlling a trailer parking brake status indicator in a tractor, comprising means for determining whether a trailer is coupled to the tractor, a control system configured to receive a signal, the signal including at least a determining means signal from the determining means that the trailer is not coupled to the tractor, the signal indicating that there is a high level of confidence that the trailer is not coupled to the tractor, the trailer parking brake status indicator, the trailer parking brake status indicator turning on to provide an indication that a trailer parking brake is being applied when a pressure sensor senses a first pressure in an air supply line (a) when the air supply line is connected to the trailer parking brake of a trailer connected to the tractor and the parking brake is applied, and, alternatively, (b) when the air supply line is not connected to any trailer parking brake, and an operator controlled control, the operator controlled control being configured to provide a signal to the control system that the operator controlled control has been operated, wherein the control system is configured to turn off the trailer parking brake status indicator when (a) the control system receives the signal that there is the high level of confidence that the trailer is not coupled to the tractor, and (b) the operator operates the operator controlled control.

Example 2. The apparatus as set forth in example 1, wherein the operator controlled control is associated with operation of the tractor with a connected trailer.

Example 3. The apparatus as set forth in example 2, wherein the operator controlled control is a trailer air supply lever.

Example 4. The apparatus as set forth in example 1, wherein the operator controlled control comprises an operator controlled service brake pedal, the service brake pedal being configured to provide a signal to the control system whether the service brake is being depressed, and an operator controlled transmission, the transmission being configured to provide a signal to the control system when the transmission has been shifted from neutral to drive.

Example 5. The apparatus as set forth in example 4, wherein the control system is configured to turn off the trailer parking brake status indicator when the operator depresses the service brake pedal and shifts the transmission from neutral to drive.

Example 6. The apparatus as set forth in example 1, wherein the control system is configured to turn off the trailer parking brake status indicator when, in addition to the control system receiving the signal indicating that no trailer is coupled to the tractor, and the operator operating the operator controlled control, the tractor is at standstill.

Example 7. The apparatus as set forth in example 1, comprising means for determining whether the operator has left a cab of the tractor for more than a predetermined length of time and sending a signal to the control system upon determining that the operator has left the cab of the tractor for more than the predetermined length of time, the signal indicating that there is not a high level of confidence that the trailer is not coupled to the tractor.

Example 8. The apparatus as set forth in example 1, wherein, upon turning off the trailer parking brake status indicator when the control system receives the signal that there is the high level of confidence that the trailer is not coupled to the tractor and the operator operates the operator controlled control, the control system is configured to turn on a bobtail mode indicator.

Example 9. A method for controlling a trailer parking brake status indicator in a tractor, comprising determining whether there is a high level of confidence that a trailer is not coupled to the tractor, sensing with a pressure sensor whether a first pressure is present in an air supply line to a trailer parking brake (a) when the air supply line is connected to the trailer parking brake of a trailer connected to the tractor and the parking brake is applied, and, alternatively, (b) when the air supply line is not connected to any trailer parking brake, turning on the trailer parking brake status indicator to provide an indication that the trailer parking brake is being applied when the pressure sensor senses the first pressure in the air supply line, operating an operator controlled control that is configured to provide a signal that the operator controlled control has been operated, turning off the trailer parking brake status indicator when (a) there is the high level of confidence that the trailer is not coupled to the tractor, and (b) the operator operates the operator controlled control.

Example 10. The method as set forth in example 9, wherein the operator controlled control is associated with operation of the tractor with a connected trailer.

Example 11. The method as set forth in example 10, wherein the operator controlled control is a trailer air supply lever.

Example 12. The method as set forth in example 9, wherein the operator controlled control comprises an operator controlled service brake pedal and an operator controlled transmission.

Example 13. The method as set forth in example 12, comprising turning off the trailer parking brake status indicator when the operator depresses the service brake pedal and shifts the transmission from neutral to drive.

Example 14. The method as set forth in example 9, comprising turning off the trailer parking brake status indicator when, in addition there being a high level of confidence that no trailer is coupled to the tractor, and the operator operating the operator controlled control, the tractor is at standstill.

Example 15. The method as set forth in example 9, comprising determining whether the operator has left a cab of the tractor for more than a predetermined length of time, upon determining that the operator has left the cab of the tractor for more than the predetermined length of time, and determining that there is not the high level of confidence that the trailer is not coupled to the tractor and turning the trailer parking brake status indicator on.

Example 16. The method as set forth in example 9, comprising turning on a bobtail mode indicator upon turning off the trailer parking brake status indicator when there is the high level of confidence that the trailer is not coupled to the tractor and the operator operates the operator controlled control.

Example 17. A method for modifying a tractor comprising a trailer parking brake status indicator to control the trailer parking brake status indicator, the tractor, the trailer parking brake status indicator turning on to provide an indication that the trailer parking brake is being applied when a pressure sensor senses a first pressure in an air supply line (a) when the air supply line is connected to a trailer parking brake of a trailer connected to the tractor and the trailer parking brake is applied, and, alternatively, (b) when the air supply line is not connected to any trailer parking brake, the method comprising configuring a control system to turn off the trailer parking brake status indicator upon (a) receipt of a signal indicating that there is a high level of confidence that the trailer is not coupled to the tractor, and (b) receipt of a signal from an operator controlled control that is configured to provide a signal to the control system that the operator controlled control has been operated.

Example 18. The method as set forth in example 17, wherein the operator controlled control is associated with operation of the tractor with a connected trailer.

Example 19. The method as set forth in example 18, wherein the operator controlled control is a trailer air supply lever.

Example 20. The method as set forth in example 17, wherein the operator controlled control comprises an operator controlled service brake pedal, the service brake pedal being configured to provide a signal to the control system when the service brake is being depressed, and an operator controlled transmission, the transmission being configured to provide a signal to the control system when the transmission has been shifted from neutral to drive.

Example 21. The method as set forth in example 20, comprising configuring the control system to turn off the trailer parking brake status indicator when the operator depresses the service brake pedal and shifts the transmission from neutral to drive.

Example 22. The method as set forth in example 17, comprising configuring the control system to turn off the trailer parking brake status indicator when, in addition to the control system receiving the signal indicating that no trailer is coupled to the tractor, and the operator operating the operator controlled control, the tractor is at standstill.

Example 23. The method as set forth in example 17, comprising configuring the control system to interpret a signal that an operator has left a cab of the tractor for more than a predetermined length of time as indicating that there is not a high level of confidence that the trailer is not coupled to the tractor.

Example 24. The method as set forth in example 17, comprising configuring the control system to turn on a bobtail mode indicator upon turning off the trailer parking brake status indicator when the control system receives the signal that there is the high level of confidence that the trailer is not coupled to the tractor and the operator operates the operator controlled control.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An apparatus for controlling a trailer parking brake status indicator in a tractor, comprising:

means for determining whether a trailer is coupled to the tractor;

a control system configured to receive a signal, the signal including at least a determining means signal from the determining means that the trailer is not coupled to the tractor, the signal indicating that there is a high level of confidence that the trailer is not coupled to the tractor;

the trailer parking brake status indicator, the trailer parking brake status indicator turning on to provide an indication that a trailer parking brake is being applied when a pressure sensor senses a first pressure in an air supply line (a) when the air supply line is connected to the trailer parking brake of a trailer connected to the tractor and the parking brake is applied, and, alternatively, (b) when the air supply line is not connected to any trailer parking brake; and an operator controlled control, the operator controlled control being configured to provide a signal to the control system that the operator controlled control has been operated, wherein the control system is configured to turn off the trailer parking brake status indicator when (a) the control system receives the signal that there is the high level of confidence that the trailer is not coupled to the tractor, and (b) the operator operates the operator controlled control.

2. The apparatus as set forth in claim 1, wherein the operator controlled control is associated with operation of the tractor with a connected trailer.

3. The apparatus as set forth in claim 2, wherein the operator controlled control is a trailer air supply lever.

4. The apparatus as set forth in claim 1, wherein the operator controlled control comprises an operator controlled service brake pedal, the service brake pedal being configured to provide a signal to the control system whether the service brake is being depressed, and an operator controlled transmission, the transmission being configured to provide a signal to the control system when the transmission has been shifted from neutral to drive.

5. The apparatus as set forth in claim 4, wherein the control system is configured to turn off the trailer parking brake status indicator when the operator depresses the service brake pedal and shifts the transmission from neutral to drive.

6. The apparatus as set forth in claim 1, wherein the control system is configured to turn off the trailer parking brake status indicator when, in addition to the control system receiving the signal indicating that no trailer is coupled to the tractor, and the operator operating the operator controlled control, the tractor is at standstill.

7. The apparatus as set forth in claim 1, comprising means for determining whether the operator has left a cab of the tractor for more than a predetermined length of time and sending a signal to the control system upon determining that the operator has left the cab of the tractor for more than the predetermined length of time, the signal indicating that there is not a high level of confidence that the trailer is not coupled to the tractor.

8. The apparatus as set forth in claim 1, wherein, upon turning off the trailer parking brake status indicator when the control system receives the signal that there is the high level of confidence that the trailer is not coupled to the tractor and the operator operates the operator controlled control, the control system is configured to turn on a bobtail mode indicator.

9. A method for controlling a trailer parking brake status indicator in a tractor, comprising:

determining whether there is a high level of confidence that a trailer is not coupled to the tractor;

sensing with a pressure sensor whether a first pressure is present in an air supply line to a trailer parking brake (a) when the air supply line is connected to the trailer parking brake of a trailer connected to the tractor and the parking brake is applied, and, alternatively, (b) when the air supply line is not connected to any trailer parking brake, turning on the trailer parking brake status indicator to provide an indication that the trailer parking brake is being applied when the pressure sensor senses the first pressure in the air supply line;

operating an operator controlled control that is configured to provide a signal that the operator controlled control has been operated, turning off the trailer parking brake status indicator when (a) there is the high level of confidence that the trailer is not coupled to the tractor, and (b) the operator operates the operator controlled control.

10. The method as set forth in claim 9, wherein the operator controlled control is associated with operation of the tractor with a connected trailer.

11. The method as set forth in claim 10, wherein the operator controlled control is a trailer air supply lever.

12. The method as set forth in claim 9, wherein the operator controlled control comprises an operator controlled service brake pedal and an operator controlled transmission.

13. The method as set forth in claim 12, comprising turning off the trailer parking brake status indicator when the operator depresses the service brake pedal and shifts the transmission from neutral to drive.

14. The method as set forth in claim 9, comprising turning off the trailer parking brake status indicator when, in addition there being a high level of confidence that no trailer is coupled to the tractor, and the operator operating the operator controlled control, the tractor is at standstill.

15. The method as set forth in claim 9, comprising determining whether the operator has left a cab of the tractor for more than a predetermined length of time, and upon determining that the operator has left the cab of the tractor for more than the predetermined length of time, determining that there is not the high level of confidence that the trailer is not coupled to the tractor and turning the trailer parking brake status indicator on.

16. The method as set forth in claim 9, comprising turning on a bobtail mode indicator upon turning off the trailer parking brake status indicator when there is the high level of confidence that the trailer is not coupled to the tractor and the operator operates the operator controlled control.

17. A method for modifying a tractor comprising a trailer parking brake status indicator to control the trailer parking brake status indicator, the tractor, the trailer parking brake status indicator turning on to provide an indication that the trailer parking brake is being applied when a pressure sensor senses a first pressure in an air supply line (a) when the air supply line is connected to a trailer parking brake of a trailer connected to the tractor and the trailer parking brake is applied, and, alternatively, (b) when the air supply line is not connected to any trailer parking brake, the method comprising:

configuring a control system to turn off the trailer parking brake status indicator upon (a) receipt of a signal indicating that there is a high level of confidence that the trailer is not coupled to the tractor, and (b) receipt of a signal from an operator controlled control that is configured to provide a signal to the control system that the operator controlled control has been operated.

18. The method as set forth in claim 17, wherein the operator controlled control is associated with operation of the tractor with a connected trailer.

19. The method as set forth in claim 18, wherein the operator controlled control is a trailer air supply lever.

20. The method as set forth in claim 17, wherein the operator controlled control comprises an operator controlled service brake pedal, the service brake pedal being configured to provide a signal to the control system when the service brake is being depressed, and an operator controlled transmission, the transmission being configured to provide a signal to the control system when the transmission has been shifted from neutral to drive.

21. The method as set forth in claim 20, comprising configuring the control system to turn off the trailer parking brake status indicator when the operator depresses the service brake pedal and shifts the transmission from neutral to drive.

22. The method as set forth in claim 17, comprising configuring the control system to turn off the trailer parking brake status indicator when, in addition to the control system receiving the signal indicating that no trailer is coupled to the tractor, and the operator operating the operator controlled control, the tractor is at standstill.

23. The method as set forth in claim 17, comprising configuring the control system to interpret a signal that an operator has left a cab of the tractor for more than a predetermined length of time as indicating that there is not a high level of confidence that the trailer is not coupled to the tractor.

24. The method as set forth in claim 17, comprising configuring the control system to turn on a bobtail mode indicator upon turning off the trailer parking brake status indicator when the control system receives the signal that there is the high level of confidence that the trailer is not coupled to the tractor and the operator operates the operator controlled control.

* * * * *